Jan. 4, 1944.  A. R. WHITTAKER  2,338,152
FLUID METER
Filed Dec. 21, 1940  2 Sheets-Sheet 1
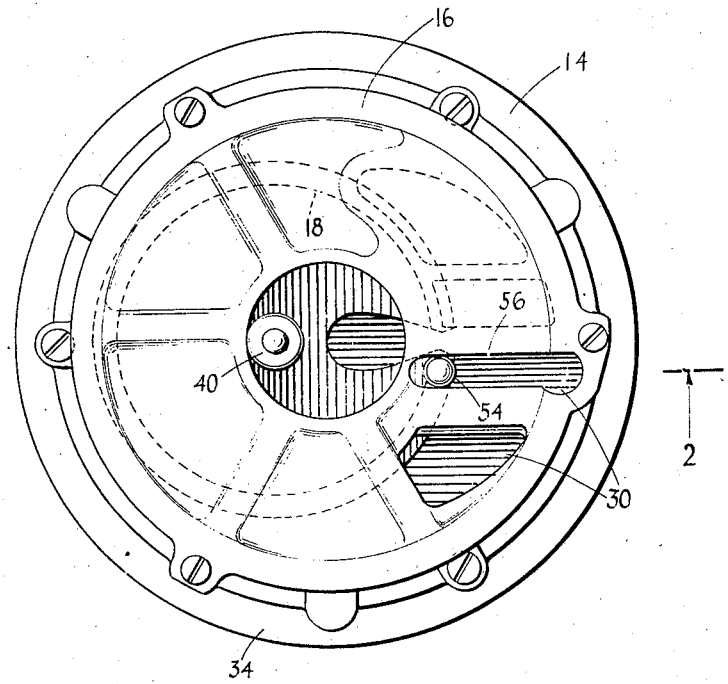
Fig. 1
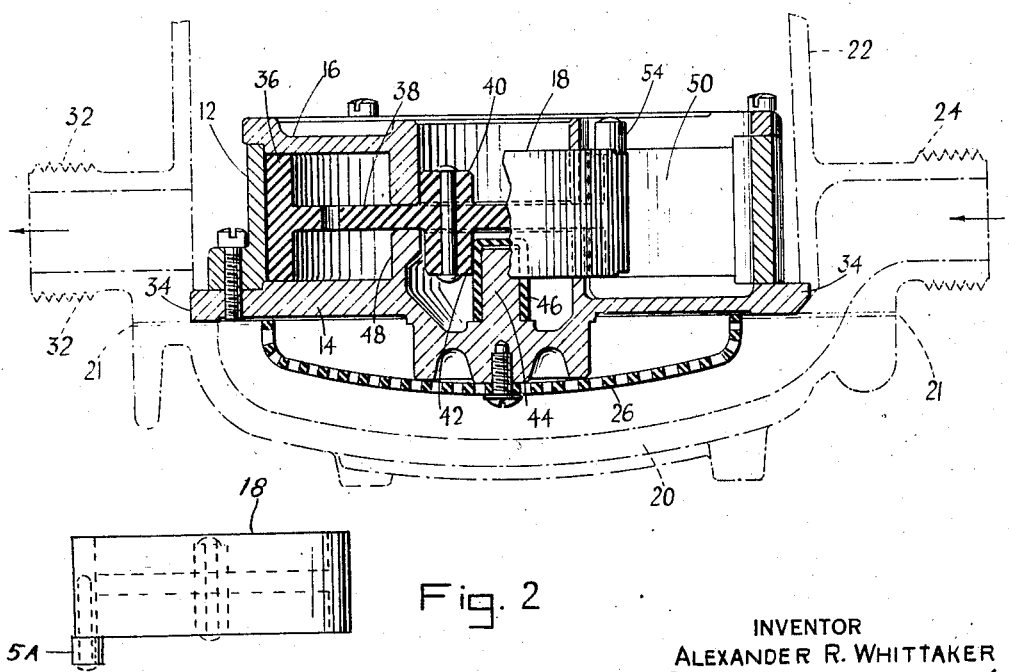
Fig. 2
Fig. 8.
INVENTOR
ALEXANDER R. WHITTAKER
BY
ATTORNEYS Jan. 4, 1944. A. R. WHITTAKER 2,338,152
FLUID METER
Filed Dec. 21, 1940 2 Sheets-Sheet 2
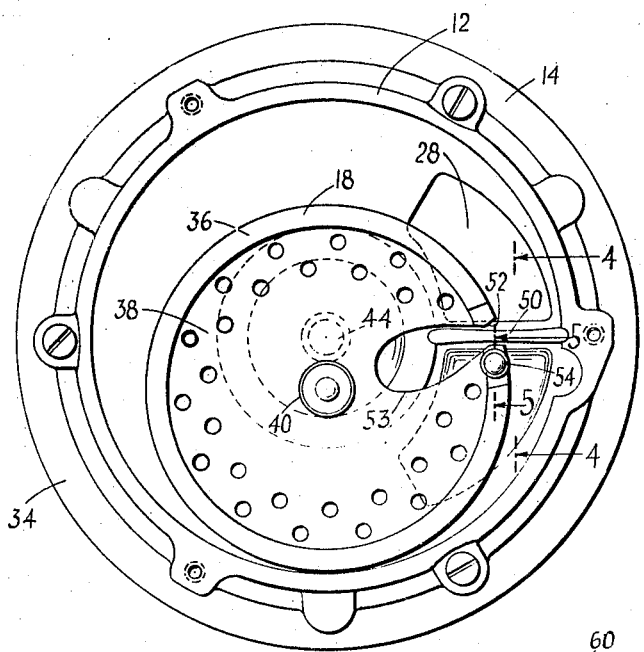
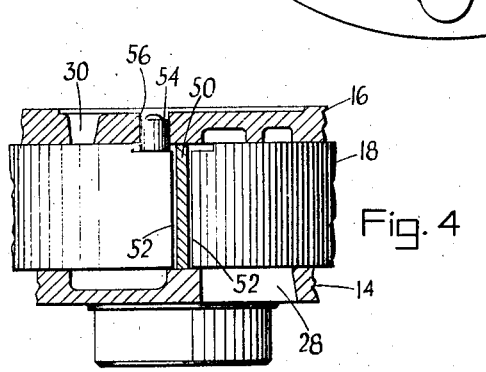
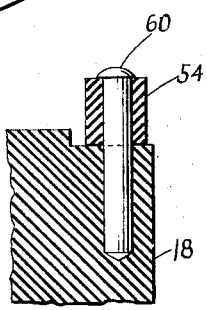
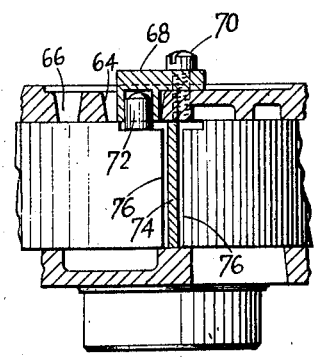
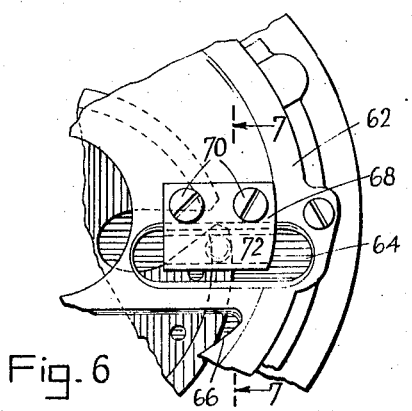
INVENTOR
ALEXANDER R. WHITTAKER
BY
ATTORNEYS Patented Jan. 4, 1944

2,338,152

UNITED STATES PATENT OFFICE 2,338,152

FLUID METER

Alexander R. Whittaker, New York, N. Y., assignor, by mesne assignments, to Pittsburgh Equitable Meter Company, Pittsburgh, Pa., a corporation of Pennsylvania Application December 21, 1940, Serial No. 371,141

3 Claims. (Cl. 121—68)

This invention relates to meters, particularly of the oscillating piston type.

The primary object of my invention is to generally improve displacement meters of the oscillating piston type. More particular objects are to increase the accuracy of the meter by reducing the frictional resistance within the meter, and at the same time to improve the quietness of operation, although this type of meter is already favorably recognized as being accurate compared to other types.

To the accomplishment of the foregoing, and such other objects as may hereinafter appear, my invention consists in the meter elements and their relation one to the other as hereinafter are more particularly described in the specification and sought to be defined in the claims. The specification is accompanied by drawings, in which:

Fig. 1 is a plan view of a measuring chamber and piston embodying my invention;

Fig. 2 is a section taken in elevation approximately in the plane of the line 2—2 of Fig. 1;

Fig. 3 is a plan view with the top head of the measuring chamber removed and with the piston in a different position;

Fig. 4 is a section taken approximately in the plane of the line 4—4 of Fig. 3;

Fig. 5 is a fragmentary section drawn to enlarged scale and taken approximately in the plane of the line 5—5 of Fig. 3;

Fig. 6 is a fragmentary plan view showing a modified construction;

Fig. 7 is a section taken in the plane of the line 7—7 of Fig. 6; and

Figure 8 is a side view of a modification having a roller on the bottom of the piston.

Referring to the drawings, and more particularly to Figs. 1, 2, and 3, the meter comprises a measuring chamber made up of a cylinder 12 (Figs. 2 and 3), a bottom head 14, and a top head 16. In Fig. 3 the top head has been removed to better show the oscillating piston 18. The measuring chamber is received within a housing having suitable pipe connections. This is schematically indicated in broken lines in Fig. 2 in which the outer housing is made up of a base 20 and a cover 22, bolted together with a suitable gasket 21 therebetween. The upper portion of cover 22 is not shown but may be of conventional construction so as to include a mounting for a totalizing register, and a packing gland through which passes a spindle carrying motion from the piston to the register. The cover 22 is usually made large enough to receive a so-called "intermediate," this being a speed reduction gear train starting with an input shaft driven by the piston 18, and terminating in an output shaft which passes through the aforesaid packing gland to the register. This is well known mechanism, and therefore has not been illustrated.

In Fig. 2 the connection 24 is ordinarily used as an inlet, and liquid flows therefrom into the base 20, and thence upwardly through a suitable strainer 26 and into the measuring chamber through a suitable inlet port 28 (see Fig. 3), cut through the bottom head 14 of the measuring chamber. Liquid leaving the measuring chamber flows upwardly through discharge ports 30 (see Fig. 1), and thus into the upper chamber of the housing. The liquid is then discharged through outlet 32.

The bottom head 14 of the measuring chamber is preferably provided with an outwardly extending flange 34 (Fig. 2) which is secured in place between the base 20 and the cover 22, and acts as a partition to divide the outer casing into upper and lower chambers. The casing may be divided by other means.

The piston 18 comprises a cylindrical wall 36 having a web 38 carrying a stem 40, 42. In the present case the web 38 is disposed half way between the top and bottom of the piston, and the lower part 42 of the stem revolves about a stud 44 projecting upwardly from the bottom head 14. A thimble-like roller 46 may be disposed over stud 44, and stem 42 is located between the stud roller 46 and a cylindrical wall 48, but bears against the roller 46. The upper stem 40 serves to drive an arm carried at the lower end of the previously mentioned input shaft of the "intermediate."

The cylinder 12 is provided at one side with a partition or so-called bridge 50, best shown in Figs. 2, 3, and 4. This bridge separates the input side of the measuring chamber from the output side, and is located between the input port 28 and the discharge ports 30. The outer wall 36 of the piston 18 is slotted at 52 (Figs. 3 and 4) to straddle the bridge 50, and the web 38 of the piston is cut away at 53 (Fig. 3) to accommodate the oscillating movement of the piston. Ordinarily the edges of the piston at 52 slidably engage the bridge 50, and the latter performs a dual function, first, in partitioning the measuring chamber, and second, in guiding the piston movement.

I have found that while this type of meter is fairly quiet, such noise as is produced by the meter is caused principally at the bridge. This is so because the slot 52 is wider than the transverse thickness of the bridge. This leaves some play or lost motion which may produce a slight noise or slap as the piston changes from engagement with one side of the bridge to the other. Even more importantly, there is a sliding frictional engagement between the piston and the bridge and, of course, any friction tends to reduce the accuracy of the meter. Wear increases the lost motion, and the noise, without, however, decreasing the friction.

In accordance with the present invention the bridge 50 is used only for the flow-dividing function, and the piston-guiding function is produced in a relatively frictionless manner by means of a special guide roller. This guide roller is indicated at 54 and projects outwardly from the piston at a point near the slot 52. The roller 54 is received in a stationary guide track 56 (Fig. 1) which, in the present species of the invention, is a slot cut through the top head 16 of the measuring chamber. This slot is offset slightly from the bridge and extends parallel to the same. It may function also as a port for the flow of liquid, and in the present case is one of the two discharge ports 30. The roller and slot may fit one another accurately and are preferably so located as to keep the edges 52 of the piston from touching the bridge, there being a slight clearance therebetween as will be seen from examination of Figs. 3 and 4 of the drawings. The bridge has often been concaved slightly on each side to compensate for angularity as the piston oscillates. In the present case it is preferably concaved more on the inlet side than on the outlet side, as the oscillation takes place about the roller 54 as a center, which in this instance is on the outlet side of the meter.

The meter here shown is intended for use with cold water. The piston is made of hard rubber, this being found eminently suitable for use with cold water, because water acts as a lubricant for rubber, and also because the piston is relatively light and is almost floated by the water, so that piston wear is negligible. The stud roller 46 (Fig. 2) and the guide roller 54 are also preferably made of hard rubber. The roller 54 is rotatably carried on a metal pin 60 (Fig. 5) which is driven with a force fit into a hole drilled in the piston to receive the same. The measuring chamber and housing may be made of metal and are preferably bronze, although the base 20 may be and often is made of cast iron.

It will be understood, however, that meters designed for other liquids may require the use of other materials. For example, rubber is not suitable for a meter intended to measure petroleum products. Such meters are usually made entirely of metal. Moreover, it may not always be convenient to form the guide track by means of a slot accurately machined in the top head of the measuring chamber. In some cases it may be more convenient to separately machine a suitable guide member and to then secure the same to the measuring chamber. Such an arrangement is shown in Figs. 6 and 7 in which the top head 62 has liquid discharge ports 64 and 66. A guide track in the form of a channeled member 68 is separately machined and is secured in the top head 62 by means of screws 70. The guide roller 72 is received in the channel of member 68, as will be clear from inspection of the drawings. As before, the guide roller and track assume the guide function previously performed by the bridge 74, and instead keep the edges 76 of the piston from contact with the bridge, the fit between the roller and channel being made quite accurate, and substantially no wear taking place because of the roller action.

In the modification shown in Figure 8 the guide roller 54 is located on the bottom of cylindrical piston 18, preferably on the side of the diaphragm or division plate 59 which is the inlet side of the meter, and it will be understood that the meter chamber bottom is slotted substantially parallel to the division plate to accommodate the roller 54. If desired, a roller may also be located at the top of the piston coaxial with the lower roller 54, although generally one roller is sufficient.

It is believed that the construction and operation, as well as the advantages of my improved meter, will be apparent from the foregoing detailed description thereof. It will be understood that the invention is adaptable to other known oscillating piston meters. For example, in some meters there are inlet ports through both the top and bottom heads, and discharge ports through both the top and bottom heads. While this necessitates a different form of casing surrounding the measuring chamber, it does not affect the present invention. In some meters the horizontal web of the piston may be located at the top or at the bottom of the piston, instead of at the middle, but the present invention is fully applicable to such a piston. It will also be understood that the guide roller of my invention may be located at the inlet side of the bridge, instead of at the discharge side, in which case the bridge, if concaved, will be so predominantly on the outlet side.

It will therefore be apparent that while I have shown and described my invention in several preferred forms, other changes and modifications may be made without departing from the spirit of the invention as sought to be defined in the following claims.

I claim:

1. A meter comprising a measuring chamber including a cylinder having top and bottom heads and inlet and outlet openings in said heads, inlet and outlet connections communicating respectively with said openings, a piston of the oscillating type within said measuring chamber, a bridge at one side of said chamber, said piston being slotted to straddle said bridge, a roller rotatably mounted on said piston close to the slot and projecting outwardly from said piston on an axis parallel to the axis of the piston, and a guide slot extending through a head of the measuring chamber and communicating with one of said connections, said slot being parallel to the bridge and receiving said guide roller.

2. A meter comprising a measuring chamber including a cylinder having top and bottom heads and inlet and outlet openings in said heads, a piston of the oscillating type within said measuring chamber, a bridge at one side of said chamber, said piston being slotted to straddle said bridge, a roller rotatably mounted on said piston close to the slot and projecting outwardly from said piston on an axis parallel to the axis of and within the periphery of the piston, and a guide channel secured to a head of the measuring chamber, said channel being offset from but extending parallel to the bridge and receiving said guide roller.

3. A meter comprising a measuring chamber including a cylinder having a closed top and bottom and an intermediate cylindrical guide extending from each head, a division plate extending from the cylindrical wall of the chamber to the cylindrical guide, the heads of said measuring chamber having inlets and outlets therein on opposite sides of the division plate, a cylindrical piston in the measuring chamber having an intermediate web passing between said guide members and a central stem adapted to be guided thereby, a guide slot in a head of the measuring chamber parallel with the division plate, and a roller mounted in the cylindrical periphery of said piston and extending into said slot.

ALEXANDER R. WHITTAKER.